US009065105B2

(12) United States Patent
Baek

(10) Patent No.: US 9,065,105 B2
(45) Date of Patent: Jun. 23, 2015

(54) BATTERY PACK WITH RIBS PROVIDED IN A CORNER OF THE BATTERY CASE

(75) Inventor: Mooryong Baek, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/607,950

(22) Filed: Sep. 10, 2012

(65) Prior Publication Data

US 2013/0224525 A1    Aug. 29, 2013

(30) Foreign Application Priority Data

Feb. 27, 2012    (KR) .................. 10-2012-0019947

(51) Int. Cl.
*H01M 2/00*    (2006.01)
*H01M 2/10*    (2006.01)

(52) U.S. Cl.
CPC ............ *H01M 2/1022* (2013.01); *H01M 2/105* (2013.01)

(58) Field of Classification Search
CPC ........................... H01M 2/105; H01M 2/1055
USPC ...................... 429/7, 99, 151, 159
See application file for complete search history.

(56) References Cited

U.S. PATENT DOCUMENTS

| 2004/0070366 | A1* | 4/2004 | Takeshita et al. ............. 320/107 |
| 2008/0254350 | A1 | 10/2008 | Moon |
| 2009/0233161 | A1 | 9/2009 | Miyamae et al. |
| 2010/0075216 | A1 | 3/2010 | Yoo |
| 2010/0178548 | A1* | 7/2010 | Baek ............................. 429/154 |
| 2011/0024207 | A1 | 2/2011 | Higashino et al. |
| 2011/0244281 | A1 | 10/2011 | Byun |

FOREIGN PATENT DOCUMENTS

| JP | 2009-224072 A | 10/2009 |
| KR | 10-0870367 B | 10/2008 |
| KR | 10-098865 B | 3/2010 |

* cited by examiner

*Primary Examiner* — Nicholas P D'Aniello
(74) *Attorney, Agent, or Firm* — Robert E. Bushnell, Esq.

(57) ABSTRACT

A battery pack having a case configured to prevent deformation. The battery pack includes a plurality of bare cells, a circuit module electrically connected to the plurality of bare cells, and a case accommodating the plurality of bare cells and the circuit module. The case includes a first case having one side opened to accommodate the plurality of bare cells and the circuit module and a second case covering the opened one side of the first case. The first case has a first planar part that is a bottom surface on which the plurality of bare cells are mounted, and first case side parts bent from the first planar part and extending toward the second case. The first case has corners formed by connecting neighboring first case side parts. A first rib unit is formed at inside of at least one of the corners.

16 Claims, 9 Drawing Sheets

BATTERY PACK WITH RIBS PROVIDED IN A CORNER OF THE BATTERY CASE

CLAIM OF PRIORITY

This application claims the benefit of Korean Patent Application No. 10-2012-0019947 filed on Feb. 27, 2012, the contents of which are incorporated herein by reference in their entirety.

BACKGROUND OF THE INVENTION

1. Field of the Invention

Aspects of the present invention relate to a battery pack.

2. Description of the Related Art

A secondary battery is formed by accommodating an electrode assembly formed by disposing a separator as an insulator between positive and negative electrode plates and an electrolyte in a case and sealing an opening of the case using a cap assembly having an electrode terminal.

Meanwhile, the secondary battery having only a unit battery (a single bare cell) may be packaged and used as a product according to the external device used. However, a plurality of unit batteries may be packaged into a pack to be commercially used. In this case, the plurality of unit batteries are mounted in the case, and the case consists of a top case and a bottom case. In general, a battery pack is formed by mounting the plurality of unit batteries in the bottom case and assembling the top case with the bottom case.

SUMMARY OF THE INVENTION

Aspects of the present invention provide an improved battery pack having a case, which can prevent the case from being deformed by improving a coupling force of the battery pack against external shocks.

According to aspects of the present invention, there is provided a battery pack including a plurality of bare cells, a circuit module electrically connected to the plurality of bare cells, and a case accommodating the plurality of bare cells and the circuit module. The case includes a first case having one side opened to accommodate the plurality of bare cells and the circuit module and a second case covering the opened one side of the first case. The first case has a first planar part that is a bottom surface on which the plurality of bare cells are mounted, and first case side parts bent from the first planar part and extending toward the second case. The first case has corners formed by connecting neighboring first case side parts, and a first rib unit is formed at inside of at least one of the corners.

The first rib unit may have a plurality of ribs connected to protrude from the inside of the corner. Each rib may be arranged to be spaced apart from a neighboring rib.

Each of the rib may be shaped of a plate and at least two side surfaces of the plate may be connected to the first case side parts at the corner.

Each of the ribs may have a first outer surface and a second outer surface connected to the first case side parts at the corner. The first outer surface and the second outer surface may have different lengths.

Each of the ribs may be shaped of a plate having a thickness greater at one end than at the other end, and the thicker one end of the plate may be connected to one of the first case side parts at the corner.

The first rib unit may further include a first reinforcement rib connecting at least two of the ribs.

The first case side part may further include a corner reinforcement unit formed at the inside of at least one corner where the neighboring side parts are connected to each other.

The second case may have a second planar part corresponding to top portions of the mounted bare cells and second case side parts bent from the second planar part and extending toward the first case. The second case may have corners formed by connecting the neighboring second case side parts to each other. A second rib unit may be formed at inside of at least one corner of the second case.

The second rib unit may be located to correspond to the first rib unit.

The second rib unit may include a plurality of ribs, each of the ribs is shaped of a plate, and at least two surfaces of the plate may be connected to and protrude from the inside of the corner.

The second rib unit may be disposed to correspond to the ribs of the first rib unit.

The second rib unit may further include a second reinforcement rib connecting at least two of the ribs.

The second rib unit may be positioned above the first rib unit, the first rib unit may include a first reinforcement rib connecting the plurality of ribs, the second rib unit may include a second reinforcement rib connecting the plurality of ribs, and the second reinforcement rib may be positioned on an imaginary line along which the first reinforcement rib extends toward the second case.

A sectional thickness of at least one of the second case side parts may be greater than a thickness of the second planar part.

A sectional thickness of at least one of the first case side parts may be greater than a thickness of the first planar part.

The first case may have a plurality of coupling grooves formed in at least one of the first case side parts, and the second case may have a plurality of coupling protrusions to be engaged with the coupling grooves.

As described, above, the battery pack constructed as the embodiment of the present invention includes a first rib unit and a second rib unit connected to protrude from the inside of each of corners of the case, thereby improving a coupling force of the battery pack against external shocks and preventing the case from being deformed due to the external shocks.

Additional aspects and/or advantages of the invention will be set forth in part in the description which follows and in part will be obvious from the description or may be learned by practice of the invention.

BRIEF DESCRIPTION OF THE DRAWINGS

The aspects, features and advantages of the present invention will be more apparent from the following detailed description in conjunction with the accompanying drawings, in which.

DETAILED DESCRIPTION OF THE INVENTION

Hereinafter, examples of embodiments of the invention will be described in detail with reference to the accompanying drawings such that they can easily be made and used by those skilled in the art.

Figure 1A:
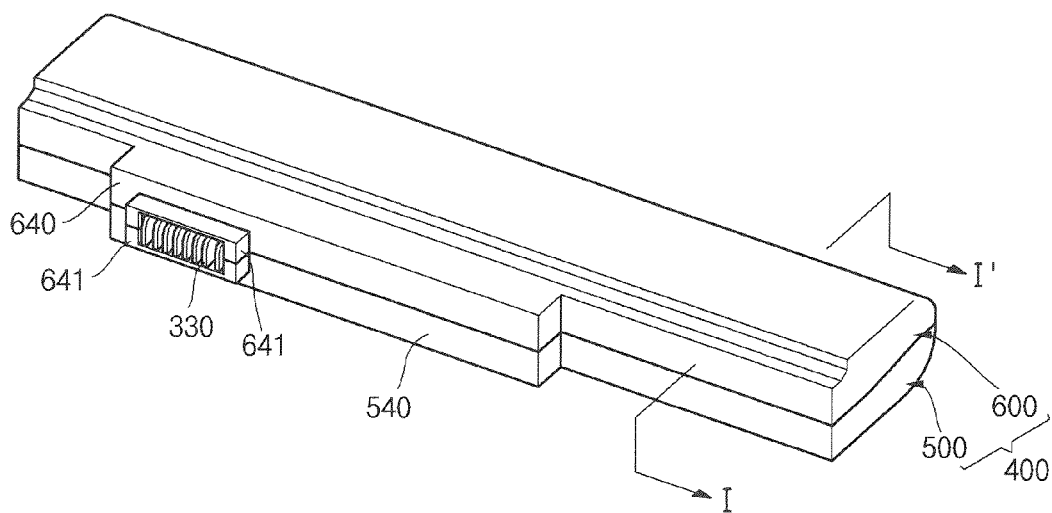
FIG. 1A is oblique view of a battery pack constructed as an embodiment of in accordance with the principles the present invention.
Figure 1B:
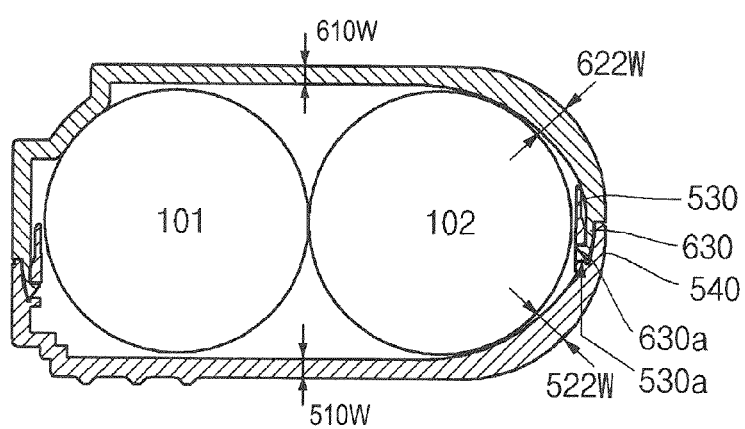
FIG. 1B is a vertical cross-sectional view of the battery pack taken along line of FIG. 1.
Figure 2:
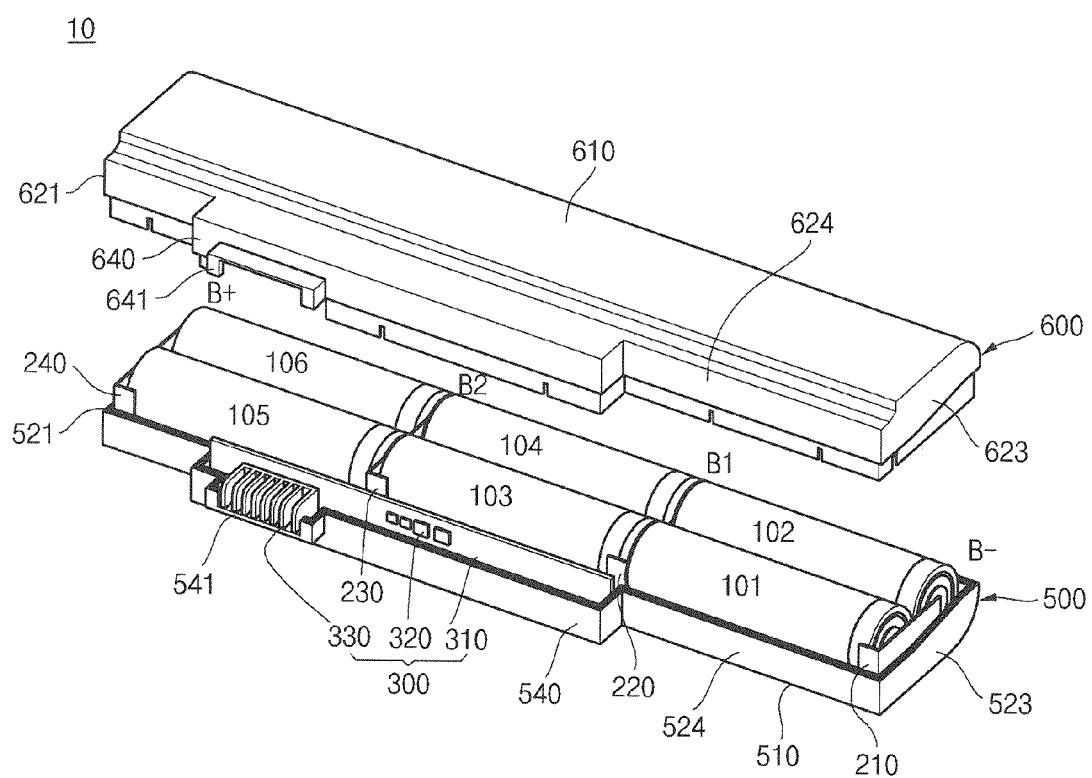
FIG. 2 is an exploded oblique view of the battery pack shown in FIG. 1.
Figure 3:
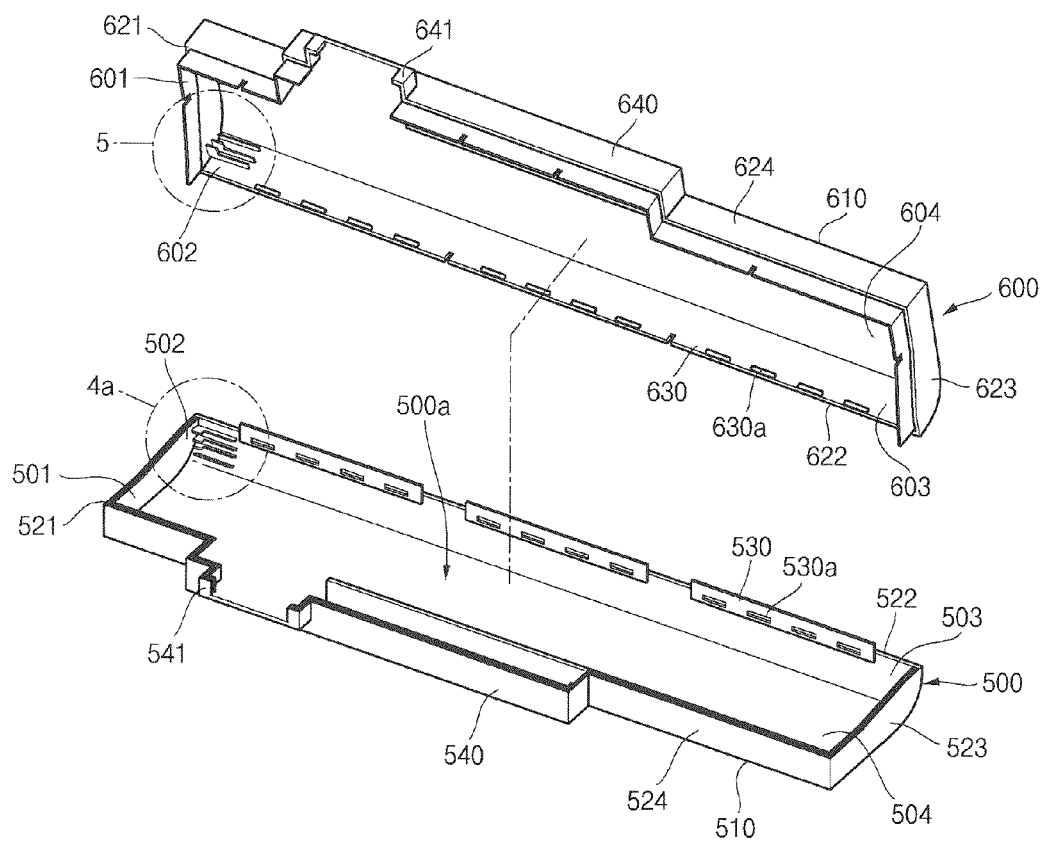
FIG. 3 is an exploded oblique view of a case constructed as an embodiment in accordance with the principles of the present invention.

FIG. 1A is an oblique view of a battery pack constructed as an embodiment in accordance with the principles of the present invention. FIG. 1B is a vertically cross-sectional view of the battery pack taken along line I-I' of FIG. 1. FIG. 2 is an exploded oblique view of the battery pack shown in FIG. 1. FIG. 3 is an exploded oblique view of a case constructed as an embodiment in accordance with the principles of the present invention.

Referring to FIGS. 1A to 3, the battery pack 10 constructed as the embodiment of the present invention includes a plurality of bare cells 101, 102, 103, 104, 105 and 106, first to fourth lead plates 210, 220, 230 and 240, a protection circuit module 300 and a case 400. The case 400 may include a first case 500 and a second case 600.

Each of the plurality of bare cells 101, 102, 103, 104, 105 and 106 includes an electrode assembly (not shown), a can accommodating the electrode assembly, and a cap assembly (not shown) coupled to a coupling hole of the can while the electrode assembly is accommodated in the can. Top and bottom surfaces of the plurality of bare cells are positive and negative electrode terminals, respectively, and may have different polarities. In the illustrated embodiment, first to sixth bare cells 101, 102, 103, 104, 105 and 106 are provided, and the first bare cell 101 and the second bare cell 102 are connected to each other in parallel, forming a first bare cell set. The third bare cell 103 and the fourth bare cell 104 are connected to each other in parallel, forming a second bare cell set. The fifth bare cell 105 and the sixth bare cell 106 are connected to each other in parallel, forming a third bare cell set. Here, the first to third bare cell sets are connected to each other in series. For the sake of convenient explanation, the aforementioned structure may be defined as a 3 series-2 parallel structure. While the 3 series-2 parallel structure is illustrated in one embodiment of the present invention, the invention is not limited, thereto as long as the number of bare cells is 2 or greater.

In FIG. 2, B+ and B− indicate high current terminals corresponding to power supply units at opposite ends of the plurality of bare cells connected to each other in series/parallel. Specifically, B+ denotes a positive electrode power unit, that is, a highest potential terminal, and B− denotes a negative electrode power unit, that is, a lowest potential terminal. Therefore, the negative electrode terminal of the first bare cell set may be a lowest potential terminal B−, and the positive electrode terminal of the third bare cell set may be a highest potential terminal B+.

Among the first to fourth lead plates, the first lead plate 210 and the fourth lead plate 240 are respectively positioned at the negative electrode terminal B− of the first bare cell set and the positive electrode terminal B+ of the third bare cell set, thereby connecting the respective bare cell sets to each other in parallel. Here, the first lead plate 210 and the fourth lead plate 240 may have a rectangular planar structure. The first lead plate 210 is welded and electrically connected to the negative electrode terminal B− of the first bare cell set, and the fourth lead plate 240 is welded and electrically connected to the positive electrode terminal B+ of the third bare cell set. Each of the first lead plate 210 and the fourth lead plate 240 may be made of a highly electrically conductive metal such as copper, nickel or aluminum. The first lead plate 210 and the fourth lead plate 240 may be directly electrically connected to pads (not shown) of the protection circuit module 300. Alternatively, the first lead plate 210 and the fourth lead plate 240 may be electrically connected to the pads of the protection circuit module 300 using separate tabs.

The second lead plate 220 and the third lead plate 230 are respectively positioned between the first bare cell set and the second bare cell set (B1) and between the second bare cell set and the third bare cell set (B2), thereby connecting the respective bare cell sets to each other in series and in parallel. Here, each of the second lead plate 220 and the third lead plate 230 may have a centrally bent portion. Therefore, the second lead plate 220 is welded and electrically connected to the positive electrode terminal of the first bare cell set and the negative electrode terminal of the second bare cell set, and the third lead plate 230 is welded and electrically connected to the positive electrode terminal of the second bare cell set and the negative electrode terminal of the third bare cell set. Each of the second lead plate 220 and the third lead plate 230 may be made of a highly electrically conductive metal such as copper, nickel or aluminum. The second lead plate 220 and the third lead plate 230 may be directly electrically connected to pads (not shown) of the protection circuit module 300. Alternatively, the second lead plate 220 and the third lead plate 230 may be electrically connected to the pads of the protection circuit module 300 using separate tabs.

The protection circuit module 300 may include a board 310, a protection circuit element 320, a connector 330 and pads (not shown).

The board 310 may include a printed circuit board 310 having a substantially rectangular shape. A conductive metal pattern (not shown) is formed within the board 310 and may be connected to the protection circuit element 320, the connector 330 and the pads.

The protection circuit element 320 is positioned on one surface of the board 310 facing the outside of the battery pack 10 and checks charge/discharge states of the plurality of bare cells and battery information regarding the current, voltage, temperature and so on, thereby protecting the battery pack 10.

The connector 330 is positioned on one surface of the board 310 facing the outside of the battery pack 10 and may be mounted on a mounting portion of the connector 330 of the first case 500. The connector 330 may serve as an electric path connected to an external electric device. The pads are positioned on one surface of the board 310 facing the plurality of bare cells and may be electrically connected to the first to fourth lead plates 210, 220, 230 and 240, respectively.

The case 400 includes a first case 500 and a second case 600. The first case 500 has one side 500a opened to accommodate the plurality of bare cells plurality of bare cells 101, 102, 103, 104, 105 and 106, the lead plates 210, 220, 230 and 240 and the protection circuit module 300. The second case 600 covers the opened one side of the first case 500. The first case 500 may be shaped of a rectangular box having an open top portion to receive the plurality of bare cells 101, 102, 103, 104, 105 and 106. A first case protection circuit module mounting portion 540 designed to correspond in shape to the protection circuit module 300 may be formed at one side of the first case 500 to receive the protection circuit module 300. A first case connector mounting portion 541 in which the connector 330 of the protection circuit module 300 is mounted may be formed in the first case protection circuit module mounting portion 540.

The first case 500 has a first planar part 510 and first to fourth side parts 521, 522, 523 and 524.

The first planar part 510 is a bottom surface on which the plurality of bare cells 101, 102, 103, 104, 105 and 106 are mounted. The first to fourth side parts 521, 522, 523 and 524 are bent from edges of the first planar part 510 and extend toward the second case 600.

A sectional thickness 522W of each of the first to fourth side parts 521, 522, 523 and 524 may be greater than a thickness 510W of the first planar part 510. Each of the first to fourth side parts 521, 522, 523 and 524 may include a first rib 530 having a plurality of coupling grooves 530a. That is to say, the coupling grooves 530a are formed on a first coupling surface of the first rib 530. The first to fourth side parts 521, 522, 523 and 524 have corners formed by connecting neighboring side parts to each other. That is, the first case 500 has corners 501, 502, 503 and 504 at the positions where neighboring side parts 521, 522, 523 and 524 meet and form an angle. While four corners are formed in the first case 500 in the illustrated embodiment, aspects of the present invention are not limited thereto.

In the present invention, the first case 500 has four corners 501, 502, 503 and 504 and a first rib unit 550 is formed at the inside of each of the four corners. For example, corner 502 may be formed by connecting the first side part 521 and the second side part 522 to each other.

Figure 4A:
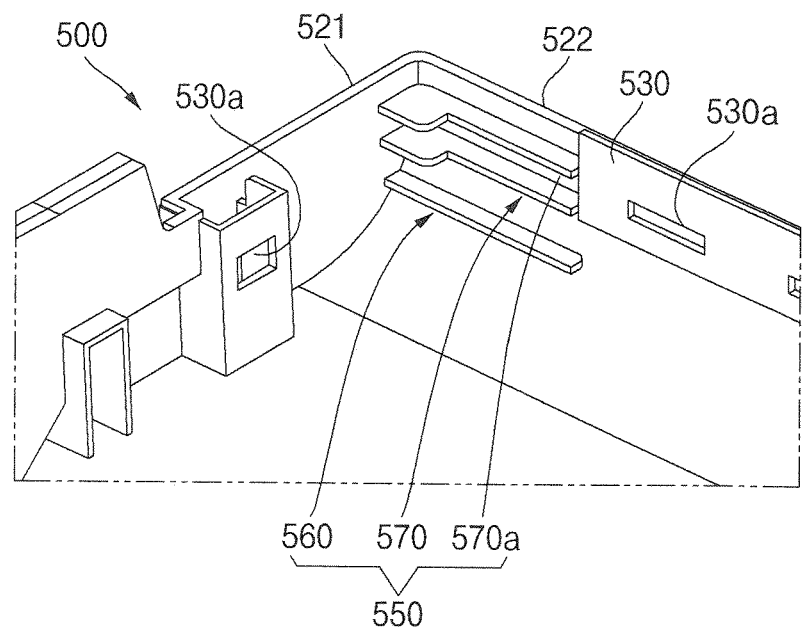
FIG. 4A is an enlarged oblique view of portion '4a' in FIG. 3, illustrating a first rib unit constructed as an embodiment in accordance with the principles of the present invention.

FIG. 4A is an enlarged oblique view of portion '4a' in FIG. 3, illustrating a first rib unit constructed as an embodiment in accordance with the principles of the present invention. Referring to FIG. 4A, the first rib unit 550 includes a plurality of ribs 560, 570 and 570a. The plurality of ribs 560, 570 and 570a are connected to protrude from the inside of the corner. In addition, the plurality of ribs 560, 570 and 570a are arranged to be spaced apart from each other. At least two side surfaces of a plate of each of the plurality of ribs 560, 570 and 570a are connected to the side parts 521 and 522 at the corner.

Figure 4B:
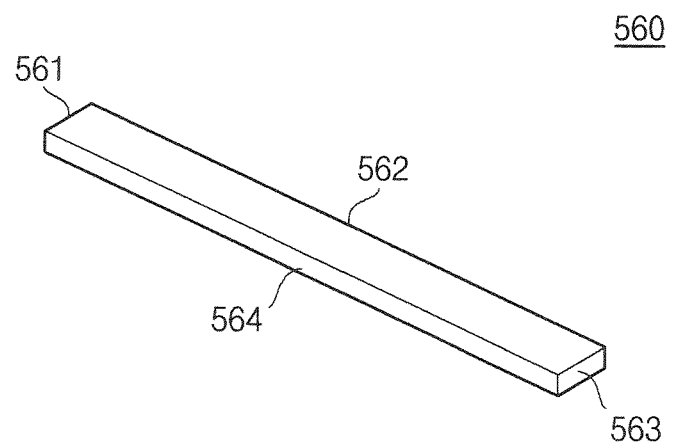
FIG. 4B is an oblique view of a rib constructed as an embodiment in accordance with the principles of the present invention.

FIG. 4B is an oblique view of a rib shown in FIG. 4A constructed as an embodiment in accordance with the principles of the present invention. Referring to FIG. 4B, the first rib 560 is shaped of a plate. The plate has four outer surfaces 561, 562, 563 and 564. The first outer surface 561 is connected to a portion of the first side part 521. The second outer surface 562 is connected to a portion of the second side part 522.

Figure 4C:
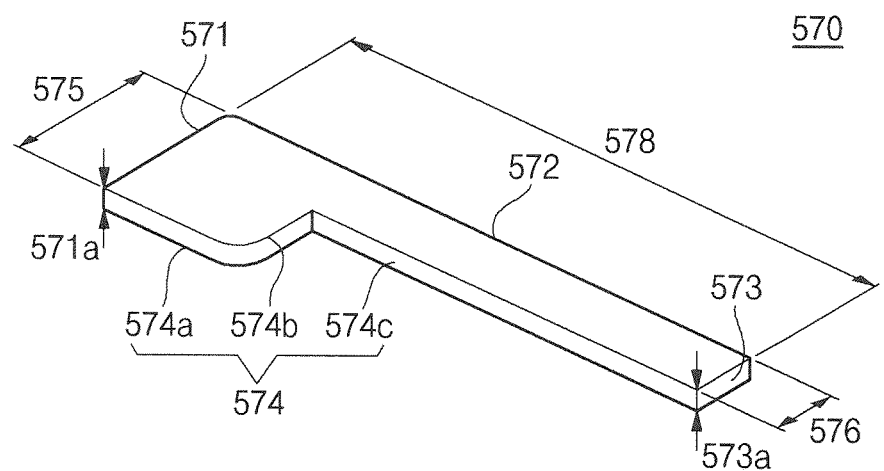
FIG. 4C is an oblique view of a rib constructed as another embodiment in accordance with the principles of the present invention.

FIG. 4C is an oblique view of a rib constructed as another embodiment in accordance with the principles of the present invention. As shown in FIG. 4C, the second rib 570 may be formed to have an 'L' shape. The plate has four outer surfaces 571, 572, 573 and 574. The second rib 570 is positioned above the first rib 560 and is connected to portions of the first side part 521 and the second side part 522. The second rib 570 may protrude to the inside of first case 500 more than the first rib 560. The second rib 570 may further include multiple second ribs formed toward the opened side of the first case 500. In FIG. 4A, reference numeral 570a refers to another second rib 570, and a repeated explanation thereof will be omitted.

The first outer surface 571 and the second outer surface 572 are vertically bent to correspond to the inside of the corner of the first case 500. The first outer surface 571 is connected to the first side part 521 and the second outer surface 572 is connected to the second side part 522. A length 575 of the first outer surface 571 may be smaller than a length 578 of the second outer surface 572 adjacent thereto. In this case, the first case 500 may be shaped of a rectangular box having the first side part 521 shorter than the second side part 522. In addition, the first outer surface 571 is longer than the third outer surface 573 formed at an end extending along the second outer surface 572. In addition, a thickness 571a of the first outer surface 571 may be greater than a thickness 573a of the third outer surface 573.

The second outer surface 572 may be longer than a first end 574a of the fourth outer surface 574 formed at an end extending along the third outer surface 573. In addition, a thickness of the second outer surface 572 may be grater than that of the first end 574a of the fourth outer surface 574.

The fourth outer surface 574 has a first end 574a bent and extending from one side of the first outer surface 571, a second end 574c bent and extending from an end of the third outer surface 573 and a third end 574b connecting the first end 574a and the second end 574c. The first end 574a protrudes to the inside of first case 500 more than the third end 574b.

The second case 600 covers the opened side of the first case 500. The second case 600 has a second planar part 610 and first to fourth side parts 621, 622, 623 and 624. The first to fourth side parts 621, 622, 623 and 624 are bent from edges of the second planar part 610 and extend toward the first case 500. A second case protection circuit module mounting portion 640 designed to correspond in shape to the protection circuit module 300 may be formed at one side of the second case 600 to cover the protection circuit module 300. A second case connector mounting portion 641 in which the connector 330 of the protection circuit module 300 is mounted may be formed in the second case protection circuit module mounting portion 640. The second case protection circuit module mounting portion 640 is located to correspond to the first case protection circuit module mounting portion 540.

A sectional thickness 622W of each of the first to fourth side parts 621, 622, 623 and 624 may be greater than a thickness 610W of the first planar part 610. Each of the first to fourth side parts 621, 622, 623 and 624 may include a second rib 630 having a plurality of coupling protrusions 630a located corresponding to the coupling grooves 530a, the coupling protrusions 630a engaged with the coupling grooves 530a. That is to say, the coupling protrusions 630a are formed on a second coupling surface of the second rib 630.

Since four corners 601, 602, 603, and 604 are formed in the second case 600 in the illustrated embodiment, second rib unit 650 is formed at the inside of each of the our corners. For example, the corner 602 may be formed by connecting the first side part 621 and the second side part 622 to each other.

Figure 5:
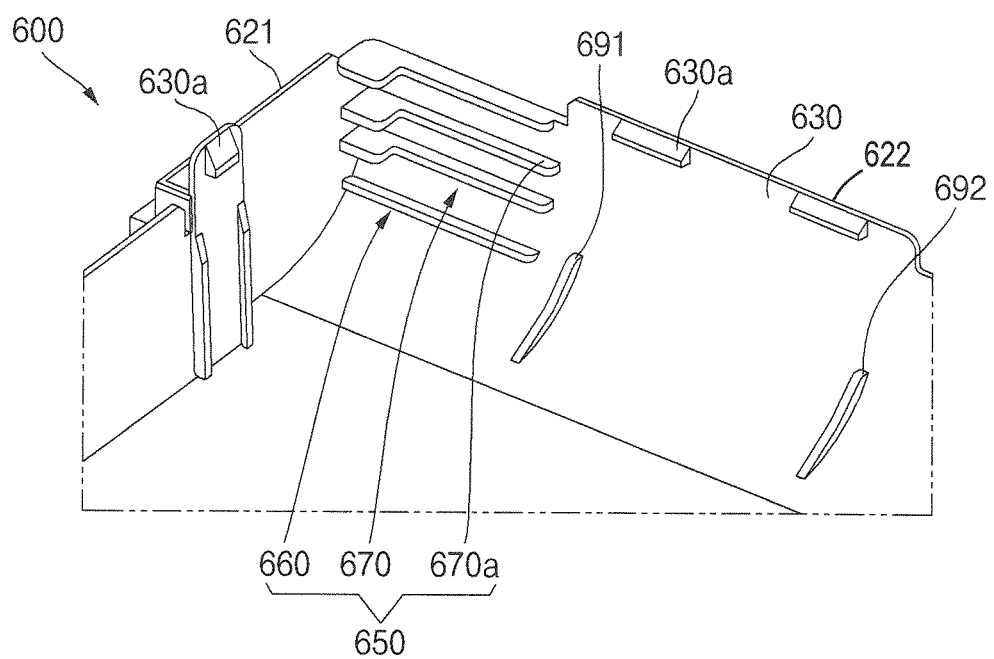
FIG. 5 is an enlarged oblique view of portion '5a' in FIG. 3, illustrating a second rib unit shown in FIG. 3 constructed as an embodiment in accordance with the principles of the present invention.

FIG. 5 is an enlarged oblique view of portion '5a' in FIG. 3, illustrating a second rib unit shown in FIG. 3 constructed as an embodiment in accordance with the principles of the present invention. As shown in FIG. 5, the second rib unit 650 is located to correspond to the first rib unit 550. The second rib unit 650 includes a plurality of ribs 660, 670 and 670a. The plurality of ribs 660, 670 and 670a are arranged to correspond to the ribs of the first rib unit 550. Since shapes of the plurality of ribs 660, 670 and 670a and connection mechanism in which the plurality of ribs 660, 670 and 670a are connected to the corners of the second case 600 are the same as those of the plurality of ribs 560, 570 and 570a of the first rib unit 550, and repeated explanation thereof will be omitted.

The second case 600 may further include vertical ribs formed on at least one of the first to fourth side parts 621, 622, 623 and 624. As shown in FIG. 5, the second case 600 includes vertical ribs 691 and 692 formed on the second side part 622. The vertical ribs further prevent the case from being deformed due to external shocks.

The case 400 has the first rib unit 550 and the second rib unit 650 respectively formed at the corners of the first case 500 and the second case 600, thereby preventing the case 400 from being deformed due to external shocks, e.g., disconnection of connected parts.

Next, a first case 1500 and a second case 1600 of a battery pack constructed as another embodiment in accordance with the principles of the present invention will be described.

Figure 6A:
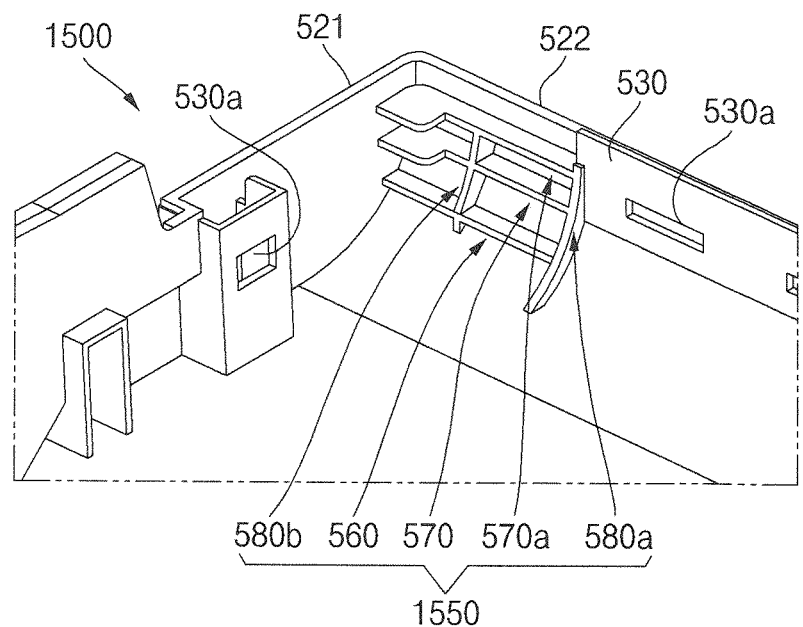
FIG. 6A is an oblique view corresponding to FIG. 4A, illustrating a third rib unit constructed as another embodiment in accordance with the principles of the present invention.

FIG. 6A is an oblique view corresponding to FIG. 4A, illustrating a third rib unit 1550 constructed as another embodiment of the present invention.

The third rib unit 1550 is formed at a corner of the first case 1500. The third rib unit 1550 includes a plurality of ribs 560, 570, 570a, 580a and 580b. Each of the plurality of ribs 560, 570 and 570a, 580a, 580b is connected to protrude from the inside of the corner. Since reference numerals 560, 570 and 570a denoting the ribs are the same as described above in the first rib unit 550, the same reference numerals are used to the same or similar parts and detailed descriptions thereof will be omitted.

The third rib unit 1550 further includes first reinforcement ribs 580a and 580b connecting at least two of the ribs. Referring to FIG. 6A, at least three ribs 560, 570 and 570a connecting the corners are connected to be spaced apart from each other. The reinforcement ribs 580a and 580b may be formed in multitude. The reinforcement rib 580a connects ends of the three ribs 560, 570 and 570a. The reinforcement rib 580b vertically connects parts of the three ribs 560, 570 and 570a. That is, the ribs 560, 570 and 570a are horizontally disposed with respect to the first planar part 510 of the first case 500, and the reinforcement ribs 580a and 580b are vertically disposed with respect to the ribs 560, 570 and 570a. The reinforcement ribs 580a and 580b protrude from the inside of the second side part 522. Since the third rib unit 1550 has multiple reinforcement ribs connecting the respective ribs 560, 570 and 570a to each other, coupling forces between each of the ribs 560, 570 and 570a can be reinforced.

Figure 6B:
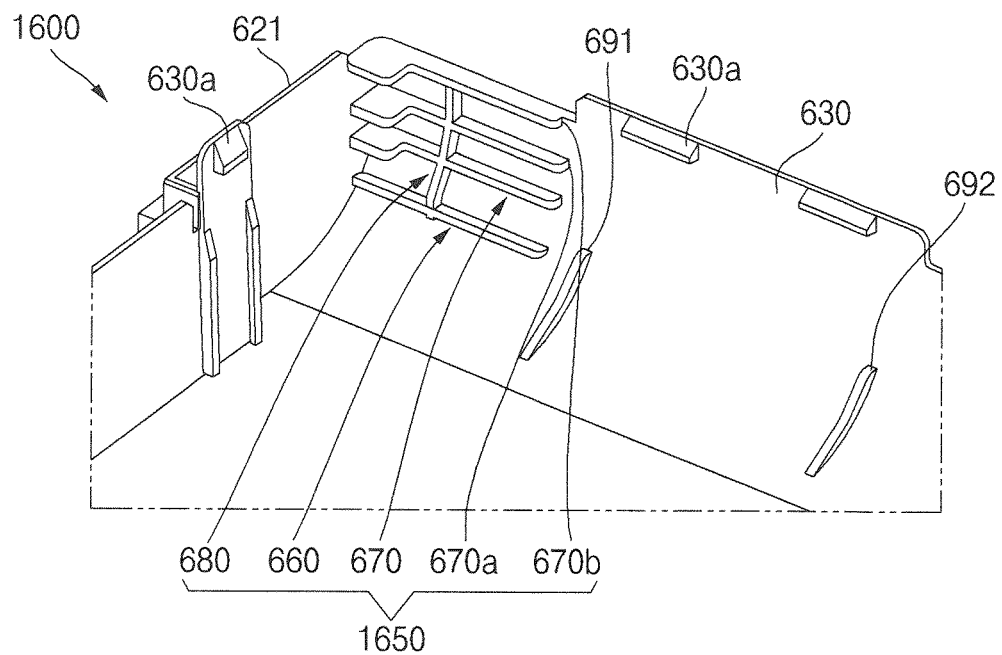
FIG. 6B is an oblique view corresponding to FIG. 5, illustrating a fourth rib unit constructed as another embodiment in accordance with the principles of the present invention.

FIG. 6B is an oblique view corresponding to FIG. 5, illustrating a fourth rib unit 1650 constructed as another embodiment of the present invention.

The fourth rib unit 1650 is formed at a corner of the second case 1600. The fourth rib unit 1650 includes a plurality of ribs 660, 670, 670a, 670b and 680. Each of the plurality of ribs 660, 670, 670a, 670b and 680 is connected to protrude from the inside of the corner. Since reference numerals 660, 670, 670a and 670b denoting the ribs are the same as described above in the second rib unit 650, the same reference numerals are used to the same or similar parts and detailed descriptions thereof will be omitted.

The fourth rib unit 1650 further includes a second reinforcement rib 680 connecting at least two of the ribs. The second reinforcement rib 680 may be formed in multitude. The second reinforcement rib 680 reinforces coupling forces between each of the ribs of the fourth rib unit 1650. The second reinforcement rib 680 may be positioned on an imaginary line along which the first reinforcement ribs 580a and 580b extend toward the second case 1600.

As a result, since the first rib unit 1550 and the second rib unit 1650 are formed at the corners of the first case 1500 and the second case 1600 of the battery pack according to another embodiment invention, deformation due to external shocks, e.g., disconnection of connected parts, can be prevented.

Next, a first case 2500 and a second case 2600 of a battery pack constructed as still another embodiment in accordance with the principles of the present invention will be described.

Figure 7A:
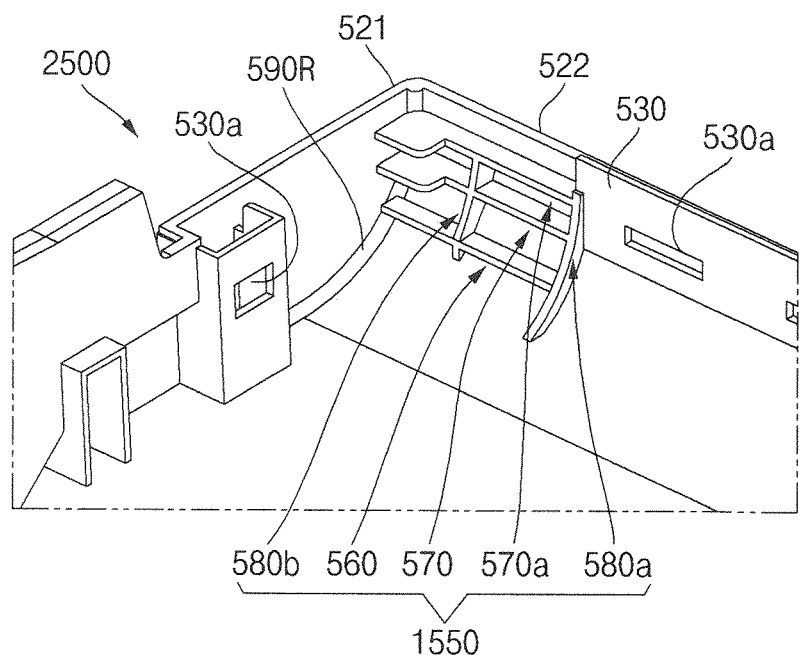
FIG. 7A is an oblique view corresponding to FIG. 4A, illustrating a first case constructed as still another embodiment in accordance with the principles of the present invention.

FIG. 7A is an oblique view corresponding to FIG. 4A, illustrating a first case 2500 constructed as still another embodiment of the present invention.

The first case 2500 has corners formed by connecting neighboring ones of first to fourth side parts 521, 522, 523 and 524. A plurality of ribs may be formed at the respective corners. The plurality of ribs may include a first rib unit 550 or a third rib unit 1550. Since the first rib unit 550 and the third rib unit 1550 have previously been described with reference to FIGS. 4A and 6A, the same reference numerals are used to the same or similar parts and detailed descriptions thereof will be omitted.

The first case 2500 has a corner rib 590R, i.e., a corner reinforcement unit, formed at a corner where the respective side parts are connected to each other. Since the corner rib 590R increases a thickness of the corner, a strength of the corner can be increased.

Figure 7B:
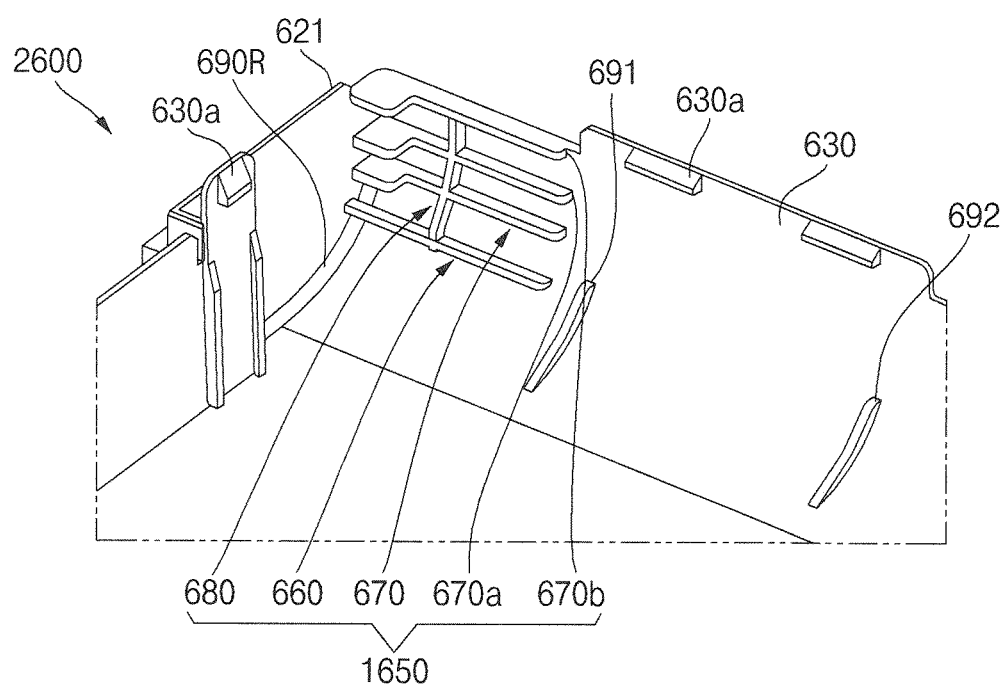
FIG. 7B is an oblique view corresponding to FIG. 5, illustrating a second case constructed as still another embodiment in accordance with the principles of the present invention.

FIG. 7B is an oblique view corresponding to FIG. 5, illustrating a second case 2600 constructed as still another embodiment of the present invention.

The second case 2600 has corners formed by connecting neighboring ones of first to fourth side parts 621, 622, 623 and 624. A plurality of ribs may be formed at the respective corners. The plurality of ribs may include a second rib unit 650 or a fourth rib unit 1650. Since the second rib unit 650 and the fourth rib unit 1650 have previously been described with reference to FIGS. 4B and 6B, the same reference numerals are used to the same or similar parts and detailed descriptions thereof will be omitted.

The second case 2600 has a corner rib 690R formed at a corner where the respective side parts are connected to each other. Since the corner rib 690R increases a thickness of the corner, a strength of the corner can be increased.

Figure 8:
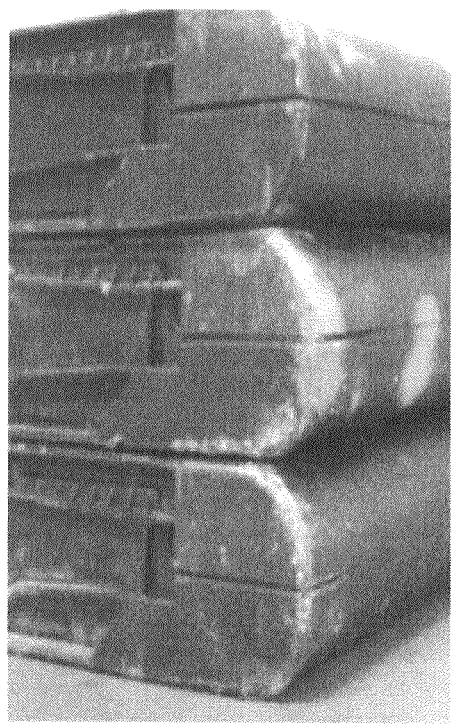
FIG. 8 is a photograph illustrating a test result of external shocks applied to a battery pack constructed in accordance with the principles of the according to the present invention.
Figure 8:
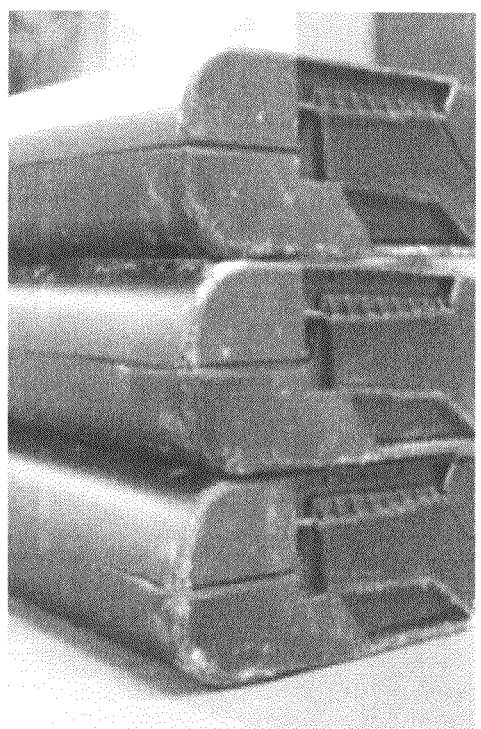
Figure 9:
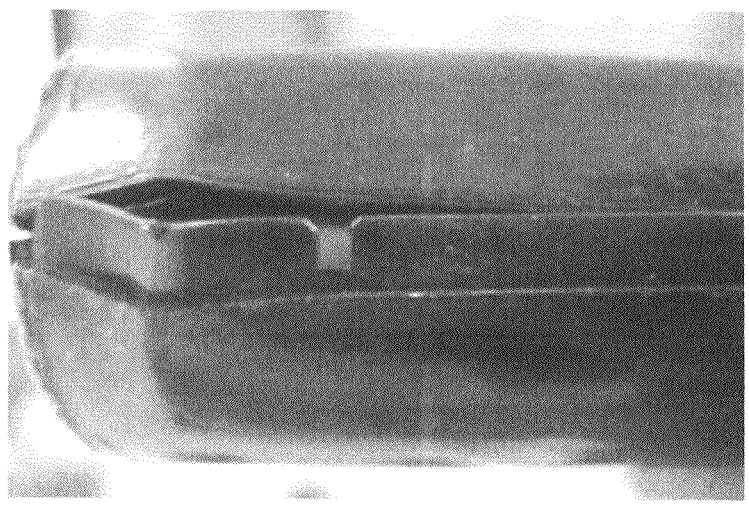
FIG. 9 is a photograph illustrating a test result of external shocks applied to a battery pack constructed in accordance with a Comparative Example.

FIG. 8 is a photograph illustrating a test result of external shocks applied to a battery pack constructed in accordance with the principles of the present invention, and FIG. 9 is a photograph illustrating a test result of external shocks applied to a battery pack constructed in accordance with a Comparative Example.

The external shock test is conducted to determine whether the case 40 of the battery pack is deformed due to a falling shock. During the external shock test, the battery pack is dropped down to a concrete bottom at a height of 100 m. Table 1 shows external shock test result. To check whether connected parts of the case 40 are separated from each other or not.

TABLE 1

| shock Test | Rib shape of first case corner | Rib shape of second case corner | Results of 10 tests |
|---|---|---|---|
| Experimental Example 1 | First rib unit | Second rib unit | ○ |
| Experimental Example 2 | Third rib unit | Fourth rib unit | ○ |
| Experimental Example 3 | First rib unit + Reinforcement rib | Second rib unit + Reinforcement rib | ○ |
| Experimental Example 4 | Third rib unit + Reinforcement rib | Fourth rib unit + Reinforcement rib | ○ |
| Experimental Example 5 | First rib unit + side part thickness reinforcement | Second rib unit + side part thickness reinforcement | ○ |
| Experimental Example 6 | third rib unit + side part thickness reinforcement | Fourth rib unit + side part thickness reinforcement | ○ |
| Comparative Example | No rib formed at corner of case | No rib formed at corner of case | X |

(○: Not deformed; X: Deformed)

As shown in FIG. 8, the external shock test results showed that the battery packs according to Experimental Examples 1 to 5 were not deformed, that is, connected parts of the case 400 were not separated from each other. In addition, no failures were found in the battery packs according to Experimental Examples 1 to 5 even after charge/discharge tests. In addition, defects due to falling shocks, e.g., a fire or electrolyte leakage, were not generated in the battery packs according to Experimental Examples 1 to 5.

According to the above described embodiment, a battery pack is provided with a case configured to prevent deformation by improving a coupling force against external shocks.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A battery pack, comprising:
a plurality of bare cells;
a circuit module electrically connected to the plurality of bare cells; and
a case accommodating the plurality of bare cells and the circuit module,
the case includes a first case having one side opened to accommodate the plurality of bare cells and the circuit module and a second case covering the opened one side of the first case,
the first case has a first planar part that is a bottom surface on which the plurality of bare cells are mounted, and first case side parts bent from the first planar part and extending toward the second case,
the first case has corners formed by connecting neighboring first case side parts, and
a first rib unit is formed at inside of at least one corner, the first rib unit comprising a plurality of longitudinally disposed ribs parallel to the first planar part, at least two of the longitudinally disposed ribs having a different shape from each other.

2. The battery pack of claim 1, wherein the plurality of longitudinally disposed ribs are connected to and protrude from the inside of the corner, and each rib is arranged to be spaced apart from a neighboring rib.

3. The battery pack of claim 2, wherein each of the longitudinally disposed ribs is shaped of a plate and at least two side surfaces of the plate are connected to the first case side parts at the corner.

4. The battery pack of claim 2, wherein each of the longitudinally disposed ribs has a first outer surface and a second outer surface connected to the first case side parts at the corner, and the first outer surface and the second outer surface of at least one of the longitudinally disposed ribs have different lengths.

5. The battery pack of claim 2, wherein at least one of the longitudinally disposed ribs is shaped of a plate having a thickness greater at one end than at the other end, and the thicker one end of the plate is connected to one of the first case side parts at the corner.

6. The battery pack of claim 2, wherein the first rib unit further includes a first vertically disposed reinforcement rib connecting the at least two longitudinally disposed ribs.

7. The battery pack of claim 1, wherein the first case further includes a corner reinforcement unit formed at the inside of at least one corner where the neighboring side parts are connected to each other.

8. The battery pack of claim 1, wherein the second case has a second planar part corresponding to top portions of the mounted bare cells and second case side parts bent from the second planar part and extending toward the first case, the second case has corners formed by connecting neighboring second case side parts to each other, and a second rib unit is formed at inside of at least one corner of the second case.

9. The battery pack of claim 8, wherein the second rib unit is located to correspond to the first rib unit.

10. The battery pack of claim 8, wherein the second rib unit includes a plurality of longitudinally disposed ribs parallel to the second planar part, at least two of the longitudinally disposed ribs having a different shape from each other, each rib is shaped of a plate, and at least two surfaces of the plate are connected to and protrude from the inside of the corner.

11. The battery pack of claim 10, wherein the ribs of the second rib unit are disposed to correspond to the ribs of the first rib unit.

12. The battery pack of claim 11, wherein the second rib unit further includes a second vertically disposed reinforcement rib connecting at least two of the longitudinally disposed ribs.

13. The battery pack of claim 12, wherein the second vertically disposed reinforcement rib is vertically aligned with a first vertically disposed reinforcement rib connecting the at least two longitudinally disposed ribs of the first rib unit.

14. The battery pack of claim 8, wherein a sectional thickness of at least one of the second case side parts is greater than a thickness of the second planar part.

15. The battery pack of claim 1, wherein a sectional thickness of at least one of the first case side parts is greater than a thickness of the first planar part.

16. The battery pack of claim 1, wherein the first case has a plurality of coupling grooves formed in at least one of the first case side parts, and the second case has a plurality of coupling protrusions to be engaged with the coupling grooves.

* * * * *